Figure 1:
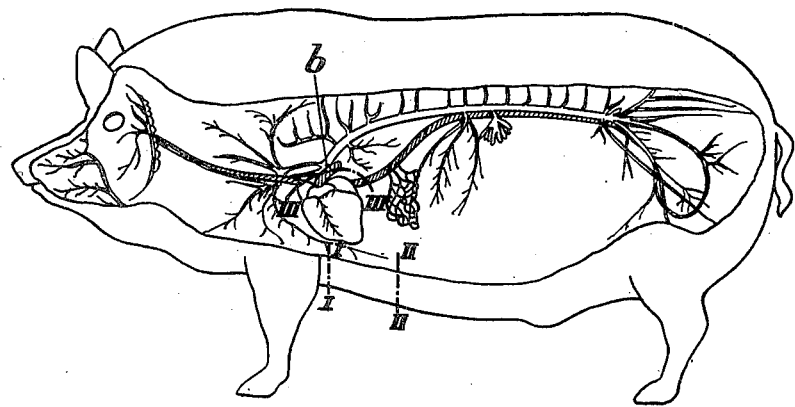

March 19, 1935.  G. BEISSER  1,994,459
PROCESS FOR PRESERVING MATERIAL OF ANIMAL ORIGIN
Filed Dec. 30, 1929

Inventor
Georg Beisser

Patented Mar. 19, 1935

1,994,459

UNITED STATES PATENT OFFICE 1,994,459

PROCESS FOR PRESERVING MATERIAL OF ANIMAL ORIGIN

Georg Beisser, Rahlstedt, near Hamburg, Germany, Charlotte Anna Beisser, widow and sole heir of Hans Georg Beisser, deceased Application December 30, 1929, Serial No. 417,399
In Germany July 29, 1929

10 Claims. (Cl. 99—1)

Processes for preserving substances of animal origin, for example flesh, fowl, fish or the like, in whole carcasses, organs or in parts of the two are known. The best known and oldest process is dry-salting, which requires about 4-6 weeks; the process generally employed at the present time is the wet salting with a duration of 3-5 weeks. It has further been proposed to carry out the wet salting under high pressure so that the time of pickling can be reduced to 2-4 weeks. Finally injection salting has become known, i. e. a process in which the preserving medium, for example the pickling brine, is introduced into the flesh under high pressure through nozzles inserted therein; by this process a pickling period of 12 days to 3 weeks can be obtained. All these processes thus have the disadvantage that relatively long pickling periods are necessary, so that considerable capital, represented by the substances which are subjected to the known process, is employed unprofitably and without returns for a considerable period. Further the injection method has the particular disadvantage of causing local pickling zones which later become apparent to the consumer by a spotty appearance of the substance so treated and thus cause aversion against the meat because of its uninviting appearance. Attempts have consequently been made to reduce the time of pickling still further and in particular pickling by way of the blood passage has been attempted. According to Fjelstrup's process pickling was effected by killing the animal by shooting it, quickly stripping the hair and placing it on its back on a hollow dish, so that the blood could run off completely. The thoracic cavity is opened by a longitudinal cut through the soft parts and sawing through the breast-bone and a canula introduced into the aorta through the opened left ventricle of the heart and tied fast. To the canula is connected a pump by which the brine, after the right ventricle of the heart has also been opened, is driven in under a pressure which corresponds to the aorta pressure. Thus the brine penetrates into the blood through the right ventricle of the heart and fills the blood-vessel system itself. The process is completed in 3-4 minutes. After division, cooling and a short storage the flesh is ready for export or curing. There is also known the Hales or Morgan pickling process in which brine is injected through the veins of an animal which has just been killed by bleeding. There is further known the Emmerich process in which the beginnings of the larger vessels are flushed with a liquid (acetic acid or the like) which arrests bacterial growth before their dismemberment. None of these newer processes has however been adopted. The experiments of Fichtenthal, according to which meat thus treated kept no longer than fresh meat, corroborated this statement therewith. The reasons are self-evident. The preserving medium introduced into the veins of the still warm carcass, i. e. before rigor mortis has set in, is below the blood pressure i. e. it flows exactly like the blood itself. Thus it moves with the velocity of the blood first through the arteries, then through the capillary vessels, from these to the branch veins and finally into the main veins so that after 3-4 minutes it appears again in the right ventricle of the heart. That is to say the preserving medium takes the same path as the blood, and thereby preserves the arteries and veins but does not enter the tissue itself in which its preservative action would be developed. The newer processes proposed for the purpose of considerably accelerating the pickling process thus suffer from fundamental disadvantages which are obviated by the invention.

According to the present invention all disadvantages of the known processes in obtaining an extraordinary reduction in the duration of the pickling process are avoided by introducing the preserving medium, such as freshly prepared brine or the like, into one of the natural vascular tracts of the flesh to be preserved under a pressure which exceeds the internal pressure of the vascular tract during the life of the animal substance and enables the diffusion of the preserving medium to take place from the capillaries into the cellular tissue, the outflow of the preserving medium from the flesh being prevented by carrying out the process after rigor mortis has set in and clamping any of the larger parts of the vascular tract in question which may have been opened. The new process thus differs fundamentally in two respects from the known processes. In the first place the preserving medium is introduced after rigor mortis has set in, i. e. in a condition in which the return flow vessels of the carcass, which as is known possess very flabby walls, are pressed together either completely or to a considerable extent by the pressure of the surrounding masses of flesh so that they oppose resistance to the egress of the preserving medium introduced and do not conduct it further.

The second fundamental difference consists therein that the pressure under which the preserving medium is maintained is greater than the internal pressure obtaining in the corresponding vascular tract during life; on the other hand the pressure must not be greater than that at which diffusion of the preserving medium from the capillary vessels into the cellular tissue takes place. If the pressure were greater the membrane-like capillaries would be torn and the preserving medium would escape. That is to say the distribution of the preserving medium produced by the osmotic process between capillaries and cellular tissue does not take place homogeneously through the whole of the flesh but would be scattered irregularly through the flesh in an undesirable and detrimental manner. The employment of high pressure up to 15 atmospheres has previously been proposed. If such a high pressure is employed the vascular tracts and connective tissue are torn even if an external opposing pressure be applied, so that the disadvantages caused by employing a preserving medium under too high a pressure which are referred to above again result. Apart from the fact that the known process is also very troublesome and requires a large technical installation it has the further decisive disadvantage that the quantity of preserving medium introduced into the flesh remains absolutely uncontrollable, because the preserving medium is returned in a circulatory course to the pressure pump. Therefore, either an insufficient quantity of preserving medium is introduced into the flesh so that it decays, or too large a quantity is injected so that the preserving medium makes the flesh unpalatable. It has already been mentioned that osmotic processes take place between the capillaries and the cellular tissue, which are utilized for the purpose of introducing the preserving medium into the cellular tissue in a state of distribution which is finer than can be obtained by other methods. Of the processes which take place during life that of the arterial blood circulation resembles that performed by the invention, since the substances conveyed by the blood are conducted in the same manner and in the same direction to the cellular tissue, whereas the life processes of the venous system for example take place in the opposite direction, as substances diffuse out of the cellular tissue into the venous system. Consequently the arterial blood passage is particularly suitable for the introduction of the preserving medium. This also has the further advantage that at least one artery enters into every organ and into every more important muscular tissue as for example in the fore and hind quarters. The arteries themselves are expanded by the tunica media so that, when they are pulled out, they gape apart and they can therefore be found and the canula introduced in the simplest manner. If the advantages which the introduction of the preserving medium into the arterial bloodpassage itself ensure are forgone, the venous circulation or even the lymphatic ducts of the carcass can be used.

The process itself can be carried out on whole carcasses, or organs of these or also on separate parts of either. If, for example, the whole carcass is to be preserved, death is preferably caused by bleeding the animal through the opened aorta, when slaughter-house animals are being dealt with. As soon as rigor mortis has set in, all arteries which were opened during the preparation of the animal for example when removing the viscera, are first bound up or clamped after which the introduction of the preserving medium through a nozzle into the arterial blood passage of the carcass is effected; in particular the nozzle is inserted into the aorta. Preferably the artery through which the introduction is effected is drawn out a little from the flesh containing it, so that the piece of artery which comes into contact with the body of the nozzle can be cut off after the introduction of the medium. In this way infection is avoided in the simplest manner. Particularly important is the radio of the weight of the treated piece of flesh after introduction of the preserving medium to the weight before the introduction because this ratio determines the time of preserving and the taste. It would be an obvious precaution to measure the amount of preserving medium introduced. This method cannot be employed because after the introduction of the medium under pressure the arteries severed at the evisceration or other treatment of the animal discharge some of the preserving medium and thereby give cause for the necessary clamping. In further development of the invention therefore the introduction of the preserving medium is stopped as soon as the weight of the piece of flesh after the introduction bears a relation to the weight of the flesh before the introduction which is suitable for its preservation; when using brine having a composition of about 33 per cent by weight salt, 8 per cent by weight sugar and 59 per cent by weight water, the quantity of brine to be introduced amounts to 4% of the weight of the flesh. For this purpose the piece of flesh lies on a weighing machine during the introduction on which the actual increase owing to the weight of the medium introduced can be read off. The treated piece of flesh can be directly subjected to further processes of treatment, in particular to boiling and smoking, without storage (evaporation) or soaking.

It has already been mentioned that whole carcasses can be subjected to the process. In this case it is immaterial whether the carcasses are subjected to the process with or without the hide; the hide must not however in this case be cut away because in this way a large number of fairly large vessels are opened, among others also those belonging to the blood-vessel system through which the introduction of the preserving medium is to be effected; in this case too many clamps would be required. The process becomes simpler if the hide is simply taken off with the hammer in known manner. If in this case also capillary vessels are opened; these dry relatively quickly as they contain uncoagulated blood owing to the passages being closed by the blood coagulating when exposed to air, so that no large discharge of preserving medium occurs. Cuts in the flesh or in the gland, as prescribed by the meat inspection law, do no harm because the blood vessels opened by these cuts can be clamped. There is also no danger that the preserving medium will not reach all parts of the tissue owing to the breaking of the blood vessel in question, since as is known the outward and return passages of one and the same vascular tract are connected together by means of anastomoses. These anastomoses then conduct the preserving medium over to the adjacent vessel by the capillary system of which it is again carried to the place at which the cut occurred. Similarly, as above explained, any organ and any of the parts into which a carcass is usually cut up can be independently subjected to the process because at least one artery leads into the organ or piece of tissue through which the introduction of the preserving medium can be effected. If the introduction is effected through the arteries the blood coagulate remaining in the veins also does not cause trouble. The larger arterial and venous tracts run fairly parallel one to another so that the artery which is swelled with preserving medium acts on the adjacent vein like a moving plug and presses the old blood out of it.

The drawing shows a method of carrying out the new process by way of example of preserving the entire carcass of a pig.

Fig. 1 shows the chief parts of the blood circulation and in it the main veins are cross-hatched in order to distinguish them from the large body arteries. According to the previous slaughtering methods the large breast blood vessels are removed after stunning the animal. The result is, as is well-known, that only half of the blood in the animal flows out, while the other half remains in the carcass. The reason for this is the relative narrowness of the opened blood-vessel through which sufficient blood could not pass. Since according to the new process when preserving the whole carcass the opened blood-vessel at the entrance to the breast must be clamped the animal is slaughtered by a method differing from that hitherto employed namely by opening the breast along the lines I—I and II—II. The heart is then pressed aside and then by means of a careful cut along the line III—III between the heart on the one hand and the aorta and the veins on the other hand the bleeding to death of the animal is started. The bleeding proceeds more quickly and copiously because the largest blood passages are opened. After the carcass has been prepared for preserving in known manner and above all has cooled down and rigor mortis has set in, the arteries in so far as they have been opened when opening the breast and abdominal cavity and by the removal of certain organs, are in the first place bound up. After this the olive-shaped, thickened end $a'$ of an injection nozzle $a$, to which the conducting means for the preserving substance is connected at $a''$, is inserted in the aorta $b$.

In the foregoing it has been stressed that the preserving medium is introduced after rigor mortis has set in and with this the entire time is meant which follows the moment in which rigor mortis of the animal substance just occurs. This time element has, however, a limitation since the animal substance putrifies, that is, becomes useless for human consumption. It is, of course, evident that meat which can no longer be consumed cannot be preserved subsequently thereto. It is however, expressly pointed out that the condition of the so called autolysis is still within the time element in which the method according to the invention may be successfully employed, for autolytic meat is such meat in which solely a more pronounced formation of acid occurs which effects a solution of myosin. Furthermore hydrolitic decompositions under the exclusion and fermentative processes occur. These decomposition processes which exclusively have a reducing character are predicated upon the influence of soluble enzymes formed by the living cell which acts decomposing even after death.

In avoiding putrification autolytic meat is distinguished by its tenderness, quickened par-boiling and par-broiling, great palatability and delicacy and consequent great digestibility and consequently is absolutely consumble and this may be treated with success according to the process of the present invention.

Figure 2:
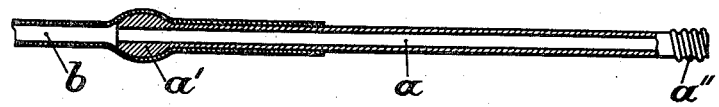

Fig. 2 shows on a somewhat enlarged scale such a nozzle at the moment of insertion in the artery $b$. The carcass is already on a weighing machine so that at the introduction of the preserving medium which is now beginning under a pressure which is greater than the arterial blood pressure, the increase in the carcass under the influence of the preserving medium can be determined and the inflow and introduction can be stopped as soon as the necessary proportion is arrived at. A further advantage of the new process is that when using for example brine as the preserving medium the salt content of this can be increased above 25° Beaumé, whereas, it was formerly below 20°. It is known that brine with a content below 20° Beaumé does not kill certain bacteria (Bacterium enteritidis and proteus) whereas they are killed at the concentration employed according to the new process. The ordinary pickling medium which was formerly composed of used brine with the addition of fresh brine can only be employed if it is thoroughly filtered, since the fine capillary vessels are stopped up by undissolved particles, dead bacteria, coagulated blood and the like present in used brine and thus thorough pickling is prevented. It has already been mentioned that the more complete removal of blood from the carcass than previously represents a further advantage to which the new process is bound to lead when the whole carcass is to be preserved. What has been described for preserving a pig naturally holds good for all other kinds of animals.

I claim:

1. The method of preserving animal substances, including the steps of permitting said substances to attain rigor mortis, and subsequently introducing into the artery a preserving medium under a pressure greater than the blood pressure in said artery to thereby cause the medium to diffuse from the artery into the cellular tissues.

2. The method of preserving organic substances of animal origin, including the steps of permitting said substance to attain rigor mortis, and subsequently introducing into the vascular tract a preserving medium under pressure, and causing the medium to diffuse from the capillary vessels into the cellular tissues.

3. The method of preserving animal substances, including the steps of permitting the substances to attain rigor mortis, and injecting a preservative into the aorta under a pressure greater than the the internal pressure during life.

4. The method of preserving organic substances of animal origin, including the steps of permitting said substance to attain rigor mortis, introducing a preserving solution into the vascular tract under pressure, and closing the larger channels of said vascular tract to prevent leakage of said solution.

5. Improvements in and relating to processes for preserving animal substances which comprise introducing a preservative, after rigor mortis has set in, into a natural vascular tract of the animal substance under a pressure which is greater than the internal pressure in the said vascular tract during life and is sufficient to cause the preservative to diffuse out of the capillary vessels into the cellular tissue, and closing any of the larger parts of the said vascular tract which may have been opened so as to prevent escape of the preservative introduced.

6. The method of preserving animal substances, including the steps of permitting said substances to attain rigor mortis, introducing salt brine of a strength in excess of 25° Beaumé into the vascular tract under a pressure greater than the internal pressure in said tract during life.

7. The method of preserving animal substances, including the steps of permitting the substances to attain rigor mortis, partly pulling out an artery from the surrounding flesh, and introducing a preservative therein under a pressure greater than the internal pressure in the artery during life.

8. Improvements in and relating to processes for preserving animal substances which comprise withdrawing part of an artery from the surrounding flesh, introducing a preservative, after rigor mortis has set in, into the said part of the artery under a pressure which is greater than the internal pressure in the artery during life and is sufficient to cause the preservative to diffuse out of the capillary vessels into the cellular tissue, closing any of the larger parts of the said artery which may have been opened so as to prevent escape of the preservative introduced and removing the said part of the artery which has been withdrawn from the flesh.

9. Improvements in and relating to processes for preserving animal substances which comprise introducing brine of a strength over 25° Beaumé, after rigor mortis has set in, into a natural vascular tract of the substance under a pressure which is greater than the internal pressure in the said vascular tract during life and is sufficient to cause the preservative to diffuse out of the capillary vessels into the cellular tissue and closing any of the larger parts of the said vascular tract which may have been opened, so as to prevent escape of the brine introduced.

10. Improvements in and relating to processes for preserving animal substances which comprise introducing a preservative, after rigor mortis has set in, into a natural vascular tract of the animal substance under a pressure which is greater than the internal pressure in the said vascular tract during life and is sufficient to cause the preservative to diffuse out of the capillary vessels into the cellular tissue, closing any of the larger parts of said vascular tract which may have been opened, determining the weight of the preservative introduced and stopping the introduction of the preservative when the weight introduced is sufficient for preservation.

GEORG BEISSER.